US012804435B2

(12) United States Patent
Hong

(10) Patent No.: US 12,804,435 B2
(45) Date of Patent: Nov. 17, 2026

(54) INFORMATION TRANSMISSION METHOD, USER EQUIPMENT, BASE STATION DEVICE AND COMPUTER STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 724 days.

(21) Appl. No.: 17/996,017

(22) PCT Filed: Apr. 13, 2020

(86) PCT No.: PCT/CN2020/084558
§ 371 (c)(1),
(2) Date: Oct. 12, 2022

(87) PCT Pub. No.: WO2021/207899
PCT Pub. Date: Oct. 21, 2021

(65) Prior Publication Data

US 2023/0199542 A1 Jun. 22, 2023

(51) Int. Cl.
*H04W 4/00* (2018.01)
*H04W 24/10* (2009.01)
*H04W 76/20* (2018.01)

(52) U.S. Cl.
CPC ........... *H04W 24/10* (2013.01); *H04W 76/20* (2018.02)

(58) Field of Classification Search
CPC ..... H04W 24/10; H04W 76/20; H04W 48/16; H04W 76/27; H04W 24/02;
(Continued)

(56) References Cited

U.S. PATENT DOCUMENTS 10,595,359 B2 * 3/2020 Kim ...................... H04W 76/28
2013/0121204 A1 5/2013 Lee et al.
(Continued)

FOREIGN PATENT DOCUMENTS

CN 102104910 A 6/2011
CN 102348219 A 2/2012
(Continued)

OTHER PUBLICATIONS

International Search Report of International Application No. PCT/CN2020/084558, mailed Jan. 5, 2021.

*Primary Examiner* — Edan Orgad
*Assistant Examiner* — Hidayat Dabiri
(74) *Attorney, Agent, or Firm* — Finnegan, Henderson, Farabow, Garrett & Dunner, L.L.P.

(57) ABSTRACT

An information sending method performed by user equipment (UE), includes: measuring corresponding first camping information according to idle state measurement configuration information configured by a base station, wherein the UE is in an idle state; sending first signaling information to the base station, wherein the first signaling information indicates that the UE has measured the first camping information; receiving second signaling information sent by the base station, wherein the second signaling information indicates the UE to report second camping information needed by the base station, and the first camping information includes the second camping information; and reporting the second camping information to the base station, wherein the second camping information is used by the base station to adjust a camping configuration of the UE when re-entering the idle state.

13 Claims, 3 Drawing Sheets

(58) Field of Classification Search
CPC .. H04W 52/0209; H04W 76/28; Y02D 30/70; H04L 5/0053
See application file for complete search history.

(56) References Cited

U.S. PATENT DOCUMENTS

| | | | | |
|---|---|---|---|---|
| 2013/0170362 | A1* | 7/2013 | Futaki | H04W 24/10 370/241.1 |
| 2013/0178224 | A1* | 7/2013 | Chang | H04W 24/10 455/452.1 |
| 2013/0294281 | A1 | 11/2013 | Lee et al. | |
| 2014/0155056 | A1 | 6/2014 | Jactat et al. | |
| 2017/0311193 | A1* | 10/2017 | Jiang | H04W 24/10 |
| 2017/0374574 | A1* | 12/2017 | Lee | H04W 24/08 |
| 2019/0037425 | A1* | 1/2019 | Hong | H04W 72/23 |
| 2019/0335477 | A1* | 10/2019 | Nam | H04W 72/542 |
| 2020/0092763 | A1* | 3/2020 | Yerramalli | H04W 36/0061 |
| 2020/0252823 | A1* | 8/2020 | Kim | H04W 48/16 |
| 2020/0344629 | A1* | 10/2020 | Kim | H04W 52/0209 |
| 2024/0098547 | A1* | 3/2024 | Kim | H04W 24/10 |
| 2025/0151151 | A1* | 5/2025 | Jung | H04W 76/20 |

FOREIGN PATENT DOCUMENTS

| | | | |
|---|---|---|---|
| CN | 102938905 | A | 2/2013 |
| CN | 103200603 | A | 7/2013 |
| CN | 103369566 | A | 10/2013 |
| CN | 103988540 | A | 8/2014 |
| CN | 104602282 | A | 5/2015 |
| CN | 105517042 | A | 4/2016 |
| CN | 106658599 | A | 5/2017 |
| CN | 109451819 | A | 3/2019 |
| CN | 110267277 | A | 9/2019 |
| CN | 101931984 | A | 12/2020 |
| WO | WO 2011/093653 | A2 | 8/2011 |
| WO | WO 2015/169238 | A1 | 11/2015 |

* cited by examiner

INFORMATION TRANSMISSION METHOD, USER EQUIPMENT, BASE STATION DEVICE AND COMPUTER STORAGE MEDIUM

CROSS-REFERENCE TO RELATED APPLICATION

The application is a U.S. National Stage of International Application No. PCT/CN2020/084558 filed on Apr. 13, 2020, the entire content of which is incorporated herein by reference.

TECHNICAL FIELD

The embodiments of the present disclosure relate to the field of mobile communication technologies, and in particular, the present disclosure relates to a method, a device, and a computer storage medium for adjusting camping of a user equipment (UE).

BACKGROUND

In the past few decades, mobile communication has experienced a rapid development from voice service to mobile bandwidth data service, which not only profoundly changes people's way of life, but also greatly promotes social and economic development. As the two main driving forces for the development of mobile communications in the future, the mobile Internet and the Internet of Things provide broad application scenarios for 5G. Facing the future, the thousand-fold increase in data traffic, hundreds of billions of device connections and diversified service demands will all pose severe challenges to 5G system design. 5G will meet people's needs for ultra-high traffic density, ultra-high connection density, and ultra-high mobility, and can provide users with extreme service experiences such as high-definition video, virtual reality, augmented reality, cloud desktop, and online games. 5G will penetrate into the Internet of Things and other fields, deeply integrate with industrial facilities, medical equipment, transportation, etc., to fully realize the "Internet of Everything", and effectively meet the information service needs of vertical industries such as industry, medical care, and transportation. 5G will also greatly improve the energy consumption, cost and efficiency of network construction and operation, comprehensively enhance service innovation capabilities, and expand the space of the mobile communication industry.

At present, the standardization of 5G has been completed, With the deployment and improvement of 5G networks, more and more mobile phone manufacturers have launched 5G mobile phones. In order to save the power of the mobile phone, Discontinuous Reception (DRX) is usually configured for the User Equipment (UE) on the Uu port. The configuration of DRX includes Inactivity Timer, On Duration Timer, Cycle, Start Offset, Uplink Hybrid Automatic. Repeat request Round-Trip Time (HARQ RTT) timer, downlink HARQ RTT timer, uplink retransmission timer and downlink retransmission timer, etc. The cycle, start offset and On Duration timer may be used to determine a start time point of the period of the On Duration timer.

SUMMARY

The purpose of the embodiments of the present disclosure is to solve at least one of the above-mentioned technical defects, and the following, technical solutions are specially proposed.

In an aspect, there is provided an information transmission method, performed by user equipment (UE), including:

measuring corresponding first camping information according to idle state measurement configuration information configured by a base station, wherein the UE is in an idle state;

sending first signaling information to the base station, where the first signaling information indicates that the UE has measured the first camping information;

receiving second signaling information sent by the base station, where the second signaling information indicates the UE to report second camping information required by the base station, and the first camping information includes the second camping information; and reporting the second camping information to the base station, where the second camping information is used by the base station to adjust a camping configuration of the UE when re-entering the idle state.

In an aspect, there is provided an information transmission method, performed by a base station, including:

- sending a configured idle state measurement configuration information to UE, where the idle state measurement configuration information indicates the UE to measure corresponding first camping information according to the idle state measurement configuration information when the UE is in an idle state;
- receiving first signaling information sent by the UE, where the first signaling information indicates that the UE has measured the first camping information;
- sending second signaling information to the UE, where the second signaling information is used for indicating the UE to report second camping information required by the base station, and the first camping information includes the second camping information; and
- receiving the second camping information reported by the UE, where the second camping information is used by the base station to adjust a camping configuration of the UE when re-entering the idle state.

In an aspect, there is provided a user equipment (UE), including:

- a measurement module, configured to measure corresponding first camping information according to idle state measurement configuration information configured by a base station, wherein the UE is in an idle state;
- a first sending module, configured to send first signaling information to the base station, where the first signaling information indicates that the UE has measured the first camping information;
- a first receiving module, configured to receive second signaling information sent by the base station, where the second signaling information indicates the UE to report second camping information required by the base station, and the first camping information includes the second camping information; and
- a reporting module, configured to report the second camping information to the base station, where the second camping information is used by the base station to adjust a camping configuration of the UE when re-entering the idle state.

In an aspect, there is provided a base station device, including:

- a second sending module, configured to send configured idle state measurement configuration information to UE, where the idle state measurement configuration information indicates the UE to measure corresponding camping information according to the idle state measurement configuration information when the UE is in an idle state;

a second receiving module, configured to receive first signaling information sent by the UE, where the first signaling information indicates that the UE has measured the first camping information;

a third sending module, configured to send second signaling information to the UE, where the second signaling information indicates second camping information required by the base station, and the first camping information includes the second camping information; and a third receiving module, configured to receive the second camping information reported by the UE, where the second camping information is used by the base station to adjust a camping configuration for the UE, to re-enter the idle state.

In an aspect, there is provided an electronic device, including a memory, a processor, and a computer program stored in the memory and executable on the processor, and the processor implements the above-mentioned method for adjusting camping of a user equipment (UE) when the processor executes the program.

In an aspect, there is provided a computer-readable storage medium, a computer program is stored on the computer-readable storage medium, and when the program is executed by a processor, the above-mentioned method for adjusting camping of a user equipment (UE) is implemented.

Additional aspects and advantages of the embodiments of the present disclosure will be set forth in part in the following description, which will become apparent from the following description, or may be teamed by practice of the present disclosure.

BRIEF DESCRIPTION OF THE DRAWINGS

The above-described and/or additional aspects and advantages of embodiments of the present disclosure will become apparent and readily understood from the following description of the embodiments taken in conjunction with the accompanying drawings, where.

DETAILED DESCRIPTION

Figure 1:
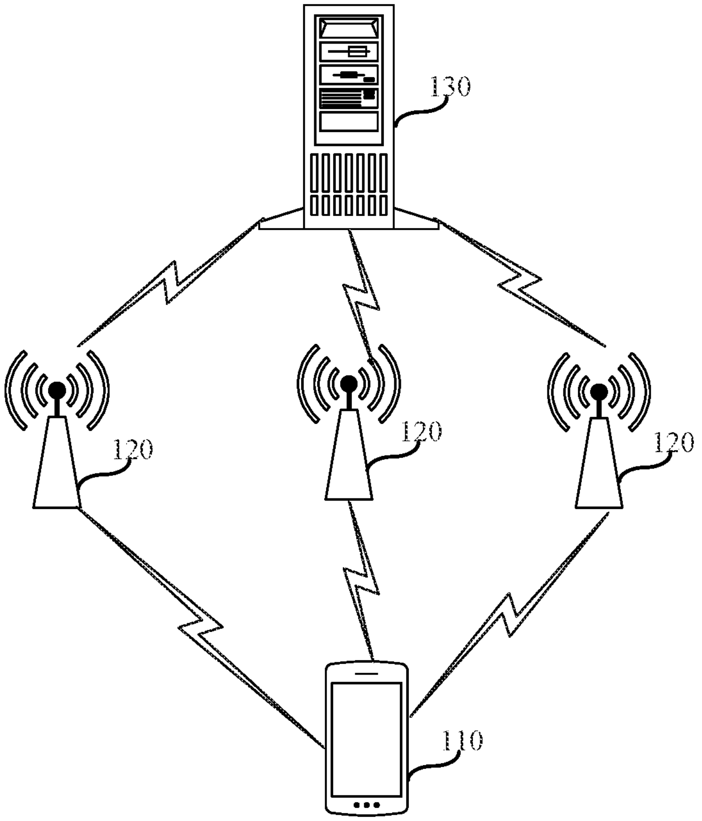
FIG. 1 is a schematic structural diagram of a wireless communication system exemplarily shown according to an embodiment of the present disclosure.

The embodiments of the present disclosure are described in detail below, examples of which are illustrated in the accompanying drawings, and the same or similar reference numerals refer to the same or similar elements or elements having the same or similar functions throughout. The embodiments described below with reference to the accompanying drawings are exemplary and are only used to explain the present disclosure, but not to be construed as a limitation of the present disclosure.

It will be understood by those skilled in the art that the singular forms “a”, “an” “said” and “the” as used herein can include the plural forms as well, unless expressly stated otherwise. It should be further understood that the word “include” used in the specification of the present disclosure refers to the presence of the stated features, integers, steps, operations, elements and/or components, but does not preclude the presence or addition of one or more other features, integers, steps, operations, elements, components and/or groups thereof. It will be understood that when we refer to an element as being “connected” or “coupled” to another element, it can be directly connected or coupled to the other element, or an intervening element may also be present. Furthermore, “connected” or “coupled” as used herein may include wirelessly connected or wirelessly coupled. As used herein, the term “and/or” includes all or any element and all combinations of one or more of the associated listed items.

5G mobile phones can only monitor the PDCCH channel during the wake-up (On duration) period, and not monitor the PDCCH channel at other times, thereby saving power consumption. The wake-up time includes running periods of an On duration timer, an inactivity timer, an uplink retransmission timer and a downlink retransmission timer.

However, during the development and use of 5G mobile phones, it is found that even if DRX is configured for 5G mobile phones, the power consumption of 5G mobile phones is still much larger than that of 4G mobile phones, and the power consumption of 5G mobile phones in the connected state and idle state is higher than that of 4G mobile phones in the same state. Current 5G mobile phones are usually multi-mode and may be backward compatible with 4G networks. Therefore, the power consumption of 5G mobile phones in the idle state can be reduced by adjusting the network camping situation of 5G mobile phones in the idle state.

The embodiments of the present disclosure provide a method for adjusting UE camping, which may be applied in a wireless communication system to realize information interaction between the UE and the base station, so that the base station can dynamically adjust the network camping situation of the UE when the UE is in the idle state again according to the camping information measured when the UE is in the idle state, thereby reducing the power consumption of the UE in the idle state.

In order to make the objectives, technical solutions and advantages of the embodiments of the present disclosure clearer, the implementation manners of the present disclosure will be further described in detail below with reference to the accompanying drawings.

The technical solutions of the embodiments of the present disclosure and how the technical solutions of the embodiments of the present disclosure solve the above-mentioned technical problems will be described in detail below with specific embodiments. The following specific embodiments may be combined with each other, and the same or similar concepts or processes may not be repeated in some embodiments. The embodiments of the present disclosure will be described below with reference to the accompanying drawings.

FIG. 1 is a schematic structural diagram of an exemplary wireless communication system. As shown in FIG. 1, the mobile communication system may include: several user equipments 110 and several base stations 120.

The user equipment 110 may communicate with one or more core networks via a Radio Access Network (RAN). The user equipment 110 may be a device that provides voice and/or data connectivity to a user, such as a smartphone, a tablet, a smart watch, or the like. The user equipment 110 may also be an IoT device, such as a sensor device, a mobile phone (or a "cellular" phone), and a computer with an IoT terminal, such as a stationary, portable, pocket-sized, hand-held, computer built-in or a vehicle-mounted apparatus, for another example, a mobile station, a mobile, a remote station, an access point, a remote terminal, an access terminal, etc., which is not limited by the embodiments of the present disclosure.

The base station 120 may be a network-side device in a wireless communication system. The wireless communication system may be a 5G system, also known as a new radio (NR) system. Alternatively, the wireless communication system may also be a next-generation system of the 5G system.

The base station 120 may be a base station (gNB) adopting a centralized distributed architecture in a 5G system. When the base station 120 adopts the centralized distributed architecture, it usually includes a central unit (CU) and at least two distributed units (DU). The central unit is provided with protocol stacks of a Packet Data Convergence Protocol (PDCP) layer, a Radio Link Control (RLC) layer, and a Media Access Control MAC) layer; and the distributed unit is provided with a Physical (PHY) layer protocol stack, and a specific implementation manner of the base station 120 is not limited in the embodiments of the present disclosure.

A wireless connection can be established between the base station 120 and the user equipment 110 through a wireless air interface. In different implementation manners, the wireless air interface is a wireless air interface based on the fifth generation mobile communication network technology (5G) standard, for example, the wireless air interface is a new air interface; or, the wireless air interface may also be a wireless air interface based a next-generation of 5G mobile communication network technology standard.

In addition, the above wireless communication system may further include a network management device 130. Several base stations 120 are respectively connected to the network management device 130. The network management device 130 may be a core network device in the wireless communication system. For example, the network management device 130 may be a Mobility Management Entity (MME) in an Evolved Packet Core (EPC) network. The network management device may also be other core network devices, which is not limited in the embodiment of the present disclosure.

Figure 2:
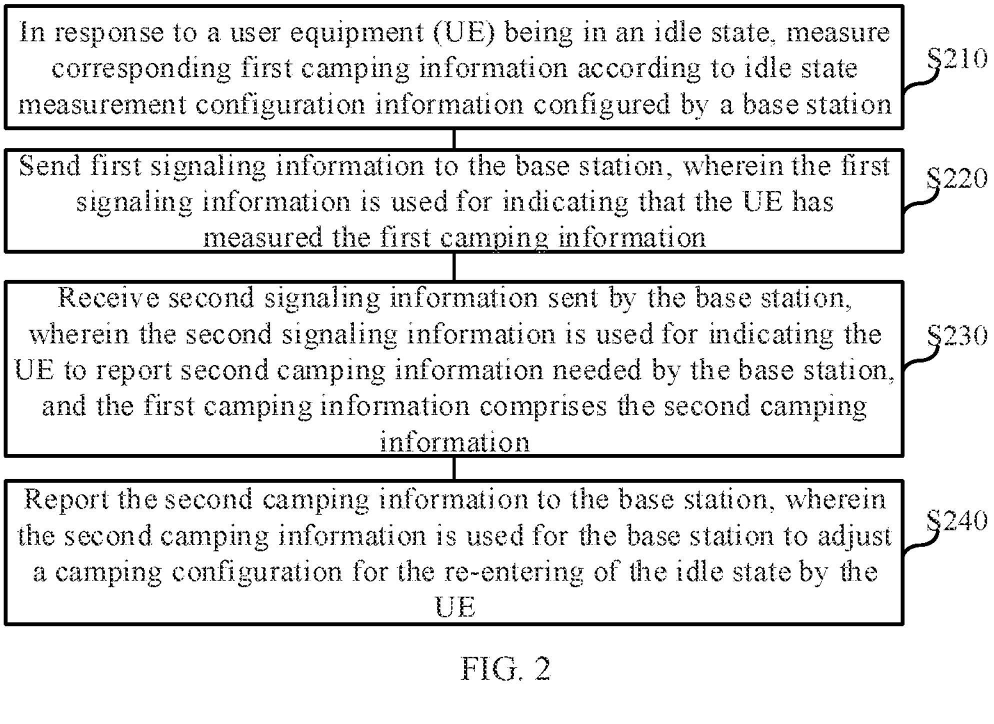
FIG. 2 is a schematic flowchart of a method for adjusting UE camping according to an embodiment of the present disclosure.

An embodiment of the present disclosure provides a method for adjusting user equipment (UE) camping. The method is applied to the wireless communication system shown in FIG. 1 and executed by the user equipment 110 shown in FIG. 1. As shown in FIG. 2, the method includes:

step S210, in response to the user equipment (UE) being in an idle state, measuring corresponding first camping information according to idle state measurement configuration information configured by the base station; step S220, sending first signaling information to the base station, where the first signaling information is used for indicating that the UE has measured the first camping information; step S230, receiving second signaling information sent by the base station, where the second signaling information is used for indicating the UE to report second camping information required by the base station, and the first camping information includes the second camping information; step S240, reporting the second camping information to the base station, where the second camping information is used by the base station to adjust a camping configuration of the UE when re-entering the idle state.

In a possible implementation manner, when the base station stores a Minimization of Drive Tests (MDT) configuration for the UE in the connected state, it may configure a measurement behavior in the idle state for the UE, and the measurement behavior is to collect the camping information after the UE enters the idle state, which is equivalent to that the base station configures the idle state measurement configuration information for the UE, so that when the UE is in the idle state, the corresponding camping information (that is, the first camping information) can be measured according to the idle state measurement configuration information. Correspondingly, the UE in the connected state has established a normal wireless connection with the base station, so the LIE in the connected state can normally exchange information with the base station, therefore the UE can receive the idle measurement configuration information configured by the base station. In this way, when the UE is in the idle state, the corresponding camping information (i.e., the first camping information) may be measured according to the idle state measurement configuration information.

In a possible implementation manner, after the UE in the connected state receives the idle state measurement configuration information configured by the base station, after entering the idle state, it can perform measurement according to the idle measurement configuration information configured by the base station to obtain the corresponding camping information (i.e., the first camping information). After measuring the first camping information, the UE may store the measured first camping information, that is, save the measured camping information in the UE.

In a possible implementation manner, after measuring the first camping information, the UE may indicate to the base station that it has the first camping information in the idle state. For example, the UE notifies the base station that the UE has the camping information in the idle state by a way of sending signaling information indicating that the camping information in the idle state has been measured, that is, the UE sends first signaling information to the base station, and the first signaling information is used for indicating that the UE has measured the first camping information.

In one example, the UE may send the First signaling information indicating that the first camping information has been measured to the base station in response to entering the connected state from the idle state. For example, the UE may send the first signaling information indicating that the first camping information has been measured to the base station during the process of entering the connected state from the idle state. For another example, the UE may send the first signaling information indicating that the first camping information has been measured to the base station after entering the connected state.

In a possible implementation manner, after receiving the first signaling information indicating that the first camping information in the idle state has been obtained sent by the UE, the base station may send to the UE signaling information (i.e., the above-mentioned second signaling information) for requesting to obtain the camping information the second camping information) required by the base station, so as to obtain the second camping information from the UE, where the first camping information includes the second camping information, that is, the base station sends to the UE the second signaling information for requesting to acquire the second camping information required by the base station. Correspondingly, the UE receives the second signaling information sent by the base station for obtaining the second camping information, that is, the UE receives the second signaling information sent by the base station, and the second signaling information is used for indicating the UE to report the second camping information required by the base station, and the first camping information includes the second camping information.

In a possible implementation manner, after the UE receives the second signaling information sent by the base station for acquiring the camping information (i.e., the second camping information), the UE may report the stored camping information (i.e., the second camping information) to the base station, so that the base station can adjust the UE's camping configuration when re-entering idle state according to the second camping information, that is, the UE reports the second camping information to the base station, and the second camping information is used by the base station to adjust the camping configuration of the UE when re-entering the idle state. The stored camping information (i.e., the second camping information) is measured by the UE according to the idle measurement configuration information configured by the base station.

With the method provided by the embodiments of the present disclosure, when the UE is in an idle state, it can accurately measure the corresponding camping information according to the idle state measurement configuration information configured by the base station, and when the UE measures the camping information, it can notify the base station in time, and according to the requirement of the base station, it reports the measured camping information to the base station, so that the base station can accurately obtain the camping information measured when the UE is in the idle state, so as to dynamically adjust the idle state camping configuration information when the UE is in the idle state again according to the camping information, which is convenient to dynamically adjust the camping situation when the UE is in the idle state again, so as to achieve the purpose of reducing the power consumption of the UE in the idle state.

In a possible implementation manner, the camping information includes Minimization of Drive Tests (MDT) information.

The idle state measurement configuration information includes one or more of the following: a measurement start time; a measurement end tittle; a measurement duration; a radio access technology (RAT) to be measured; a frequency to be measured; a cell to be measured; a quality of the cell to be measured; the RAT where the UE camps; the cell where the UE camps; the duration of the RAT where the UE camps; the duration of the cell where the UE camps; the quality of the cell where the UE camps; a measurement time interval of the UE.

The UE receiving the idle state measurement configuration information configured by the base station includes: the UE receiving the idle state measurement configuration information configured by the base station through a third RRC signaling, and the third RRC signaling includes logged measurement configuration (LoggedMeasurementConfiguration) signaling.

In a possible implementation manner, the MDT may record the quality and duration of the UE in 4G network and 5G network within a certain period of time. Therefore, when the UE is in the idle state, the camping information including the MDT information may be measured according to the received idle state measurement configuration information, so that the base station can dynamically adjust the network camping situation of the UE in the idle state based on the MDT information subsequently, to save the power of the UE.

In a possible implementation manner, when the base station configures the idle state measurement behavior (that is, idle slate measurement configuration information) for the UE, it may include one or more of the following:

the start time of measurement, e.g., at 11 p.m.;
the end time of measurement, e.g., at 6:00 a.m.;
the duration of measurement, e.g., 6 hours;
the RAT to be measured;
the frequency to be measured;
the cell to be measured;
the quality of the cell measured by the UE;
the RAT where the UE camps;
the cell where the UE camps;
a the duration of the RAT where the UE camps;
the duration of the cell where the UE camps;
a the quality of the cell where the UE camps;
the measurement tune interval of UE.

In a possible implementation manner, the base station may configure an idle state measurement behavior (i.e., idle state measurement configuration information) for the UE through a Radio Resource Control (RRC) signaling (i.e., the above-mentioned third RRC signaling). The RRC signaling may be logged measurement configuration (LoggedMeasurementConfiguration) signaling that is, the base station may send the configured idle state measurement configuration information to the UE through the LoggedMeasurementConfiguration signaling. Correspondingly, the UE may receive the idle state measurement configuration information configured by the base station through the third RRC signaling, where the third RRC signaling includes the LoggedMeasurementConfiguration signaling. The LoggedMeasurementConfiguration signaling may be used to convey a configuration parameter of MDT for recording.

In a possible implementation manner, after the UE in the connected state receives the idle state measurement configuration information sent by the base station through the LoggedMeasurementConfiguration signaling, and when the UE enters the idle state, it may measure the camping information (i.e., the first camping information) according to the configuration requirement of the base station, and stores the measurement result (i.e., the first camping information obtained by the measurement).

In an example, if the base station configures the UE to measure the signal strength of the 4G network and the signal strength of the 5G network every 1 hour within 6 hours after 11:00 p.m., then after the UE enters the idle state, it starts to measure the signal strength of the 4G network and the signal strength of the 5G network every 1 hour only after 11:00 p.m., and the measurement is continued for 6 hours, that is, the signal strength of the 4G network and the signal strength of the 5G network are measured 6 times, Meanwhile, each time the signal strength of the 4G network and the signal strength of the 5G network are measured, the corresponding measurement results are saved, that is, the signal strength of the 4G network and the signal strength of the 5G network measured each time are saved. If the UE has entered the idle state before 11 p.m., since the measurement start time (i.e., 11:00 p.m.) is not reached, the UE does not measure the signal strength of the 4G network and the signal strength of the 5G network, that is, when the measurement start time is not reached, even if the UE enters the idle state, it will not perform the measurement of the camping information.

In a possible implementation manner, the process of sending the first signaling information indicating that the first camping information has been measured to the base station may specifically be: when the UE in the idle state re-establishes a connection with the base station, sending the first signaling information indicating that the first camping information has been measured to the base station through the first radio resource control (RRC) signaling.

Although the UE in the idle state has not established a normal wireless connection with the base station and cannot send information to the base station in time, the UE in the idle state max try to establish a wireless connection with the base station by re-initiating random access. After a wireless connection is established with the base station, the UE changes from the idle state to the connected state. After the UE measures the corresponding camping information (that is, the first camping information) in the idle state according to the idle state measurement configuration information, it may indicate to the base station through RRC signaling (that is, the above-mentioned first RRC signaling) that it already has first camping information in the idle state (for example, MDT information in the idle state) during the process of re-establishing the connection with the base station and changing to the connected state. This is equivalent to that when the LIE in the idle state re-establishes the connection with the base station, the UE sends the first signaling information indicating that the first camping information has been measured to the base station through the first RRC signaling.

In a possible implementation manner when the UF, in the idle state camps on the first type of network (for example, 4G network), in the subsequent process of establishing a connection with the base station, the UE in the idle state may indicate to the base station that it has the camping information in the idle state by adding the first RRC signaling to the RRC connection establishment complete (RRCConnectionSetupComplete) signaling, or to the RRC connection reconfiguration complete (RRCConnectionReconfigurationComplete) signaling, or to the RRC connection reestablishment complete (RRCConnectionReestablishmentComplete) signaling, or to the RRC connection resume complete (RRCConnectionResumeComplete) signaling. This is equivalent to that in response to the UE camping on the first type of network, the first RRC signaling is sent through any one of the following signalings: the RRC connection establishment complete (RRCConnectionSetupComplete) signaling, the RRC connection reconfiguration complete (RRCConnectionReconfigurationComplete) signaling, the RRC connection reestablishment complete (RRCConnectionReestablishmentComplete) signaling, and the RRC connection resume complete (RRCConnectionResumeComplete) signaling, where the first type of network may be a 4G network.

In a possible implementation manner, when the UE in the idle state camps on a second type of network (for example, a 5G network), in the subsequent process of establishing a connection with the base station, the UE in the idle state may indicate to the base station that it has the camping information in the idle state by adding the first RRC signaling in the RRC setup complete (RRCSetupComplete) signaling, or in the RRC reconfiguration complete (RRCReconfigurationComplete) signaling, or in the RRC reestablishment complete (RRCReestablishmentComplete) signaling, or in the RRC resume complete (RRCResumeComplete) signaling. That is equivalent to that in response to the UE camping on the second type of network, the first RRC signaling is sent through any one of the follow in signalings: the RRC setup complete (RRCSetupComplete) signaling, the RRC reconfiguration complete (RRCReconfigurationComplete) signaling, the RRC reestablishment complete (RRCReestablishmentComplete) signaling, and the RRC resume complete (RRCResumeComplete) signaling, where the second type of network may be a 5G network.

In a possible implementation manner, after the second camping information is sent to the base station, the idle state camping configuration information configured by the base station based on the second camping information may also be received, and when the UE is in the idle state again, the camping in the idle state is adjusted according to the idle state camping configuration information.

After receiving the second camping information reported by the UE, the base station may reconfigure the idle state camping configuration information according to the second camping information, and after completing the configuration of the idle state camping configuration information, the base station sends the idle state camping configuration information configured according to the second camping information to the UE, so that when the UE enters the idle state again, it can re-adjust the camping in the idle state according to the reconfigured idle state camping configuration information, so as to realize the dynamic adjustment of the camping situation of the UE in the idle state. Correspondingly, the UE receives the idle state camping configuration information configured by the base station based on the second camping information, and when the UE is in the idle state again, it adjusts the camping in the idle state according to the idle state camping configuration information.

In a possible implementation manner, receiving the second signaling information sent by the base station includes: receiving the second signaling information for acquiring the camping information of a target type sent by the base station; sending the second camping information to the base station includes: sending the camping information of the target type to the base station; and receiving the idle state camping configuration information configured by the base station based on the second camping information includes: receiving the idle state camping configuration information configured by the base station based on the camping information of the target type.

When the UE in the idle state re-establishes the connection with the base station, after sending the first signaling information indicating that it has measured the first camping information in the idle state to the base station through the first RRC signaling, the base station may determine the required type of camping information according to its own needs based on the first signaling information (that is, the base station determines the target type of camping information, such as the target type of MDT information), where the camping information of the type required by the base station or the camping information of the target type required by the base station is the above-mentioned second camping information. After determining the camping information of the desired type (i.e., the camping information of the target type), the base station may indicate the LE to report the camping information of the target type through RRC signaling (i.e., the second signaling information). The base station may indicate the UE to report the camping information of the target type by sending the second signaling information for acquiring the camping information of the target type. Correspondingly, the UE receiving the second signaling information for acquiring the camping information of the target type sent by the base station, that is, the UE receiving the second signaling information for acquiring the second camping information sent by the base station, may be that the UE receives the second signaling information for acquiring the camping information of the target type sent by the base station.

After receiving the second signaling information, the UE that re-establishes the connection with the base station may report the stored camping information to the base station. In the process of reporting the stored camping information to the base station, the UE may determine the camping information of the type required by the base station (i.e., the camping information of the target type) from the stored camping information according to the second signaling information, and report the camping information of the target type to the base station. In other words, the UE sends the second camping information to the base station, which may be the UE sending the camping information of the target type to the base station.

After the base station receives the camping information of the target type reported by the UE, the process that the base station reconfigures the idle state camping configuration information according to the received second camping information may be that the base station reconfigures the idle state camping configuration information according to the camping information of the target type reported by the UE. Correspondingly, the LIE receives the idle state camping configuration information configured by the base station based on the camping information of the target type, that is, the UE receives the idle state camping configuration information configured by the base station based on the second camping information, which may be receiving the idle state camping configuration information configured by the base station based on the camping information of the target type.

In a possible implementation manner, receiving the second signaling information sent by the base station includes: receiving the second signaling information sent by the base station through a second RRC signaling, where the second RRC signaling is located in UE information request (UEInformationRequest) signaling; sending the second camping information to the base station includes: sending the second camping information to the base station through UE information response (UEInformationResponse) signaling.

The base station may indicate the UE to report the second camping information or the camping information of the target type by adding the RRC signaling (i.e., the second RRC signaling) to the UE information request (UEInformationRequest). Correspondingly, the UE receives the second signaling information for acquiring the second camping information sent by the base station by receiving the UE information request (UEInformationRequest) signaling sent by the base station.

After receiving the indication of the base station, the UE reports the camping information or the camping information of the target type according to the requirement of the base station. For example, after receiving the second signaling information, the UE determines the camping information of the target type from the measured camping information according to the second signaling information, and sends the camping information of the target type to the base station. The UE may send the camping information or the camping information of the target type to the base station through UE information response (UEInformationResponse) signaling.

After receiving the camping information or the camping information of the target type, the base station may configure the idle state camping configuration information according to the camping information or the camping information of the target type, and send the idle state camping configuration information to the UE, for example, the base station may send the idle state camping configuration information to the UE through RRC signaling, where the RRC signaling may be LoggedMeasurementConfiguration signaling. Correspondingly, the UE receives the idle state camping configuration information configured by the base station according to the camping information of the target type.

After the UE receives the idle state camping configuration information, when the UE enters the idle state again, it may adjust the camping in the idle state according to the idle state camping configuration information, such as camping on a 4G network. In an example, if the signal strengths of the 4G network measured by the UE after 11:00 p.m. all exceed a predetermined threshold, the base station may control the UE to camp on the 4G network after 11:00 p.m., that is, the information of "camping on the 4G network after 11:00 p.m." is configured in the idle state camping configuration information. Correspondingly, after the UE enters the idle state, according to the idle state camping configuration information, it camps on the 4G network after 11 p.m., thereby saving the power of the UE and reducing the power consumption of the UE to a certain extent.

The method of the embodiments of the present disclosure can dynamically adjust the idle state camping configuration information when the UE is in the idle state again based on the camping information measured according to the idle state measurement configuration information when the UE is in the idle state, so that the camping situation when the UE is in the idle state again is dynamically adjusted, and by dynamically adjusting the camping situation in the idle stale, the purpose of reducing the power consumption of the UE in the idle state is achieved.

Figure 3:
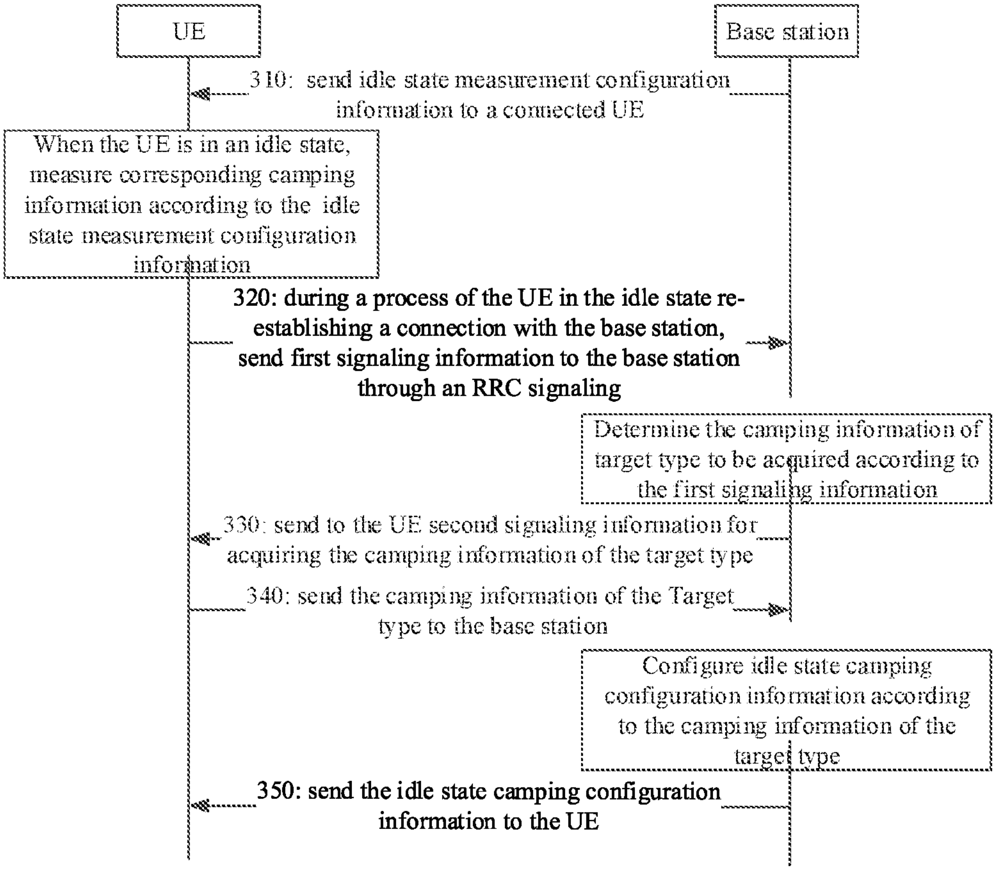
FIG. 3 is a schematic diagram of an interaction process between UE and a base station according to an embodiment of the disclosure.

FIG. 3 is a schematic diagram of an interaction process between a user equipment and a base station according to an embodiment of the present disclosure. In FIG. 3, in step 310: the base station sends idle state measurement configuration information to a connected UE, and then after the UE receives the idle state measurement configuration information, when the UE is in the idle state, it may measure the corresponding camping information according to the received idle state measurement configuration information, in step 320: during the process of re-establishing the connection with the base station, the UE in the idle state sends the first signaling information to the base station through RRC signaling, where the first signaling information is used for indicating to the base station that the UE has measured the first camping information, and then, the base station determines the camping information of the target type to be acquired according to the received first signaling information, that is, the base station determines the camping information of the type that it needs (i.e., the second camping information); in step 330: the base station sends second signaling information for acquiring the camping information of the target type to the UE, i.e., the second signaling information is sent to the UE, where the second signaling information is used for indicating the UE to report the second camping information required by the base station, where the first camping information includes the second camping information; in step 340: the UE sends the camping information of target type to the base station, that is, the UE reports the second camping information to the base station, then, the base station configures the idle state camping configuration information according to the received camping information of the target type (i.e. the second camping information); in step 350: the base station sends the idle state camping configuration information to the UE, where after the UE receives the idle state camping configuration information, when the UE is in the idle state again, the camping of idle state is adjusted according to the idle state camping configuration information.

Figure 4:
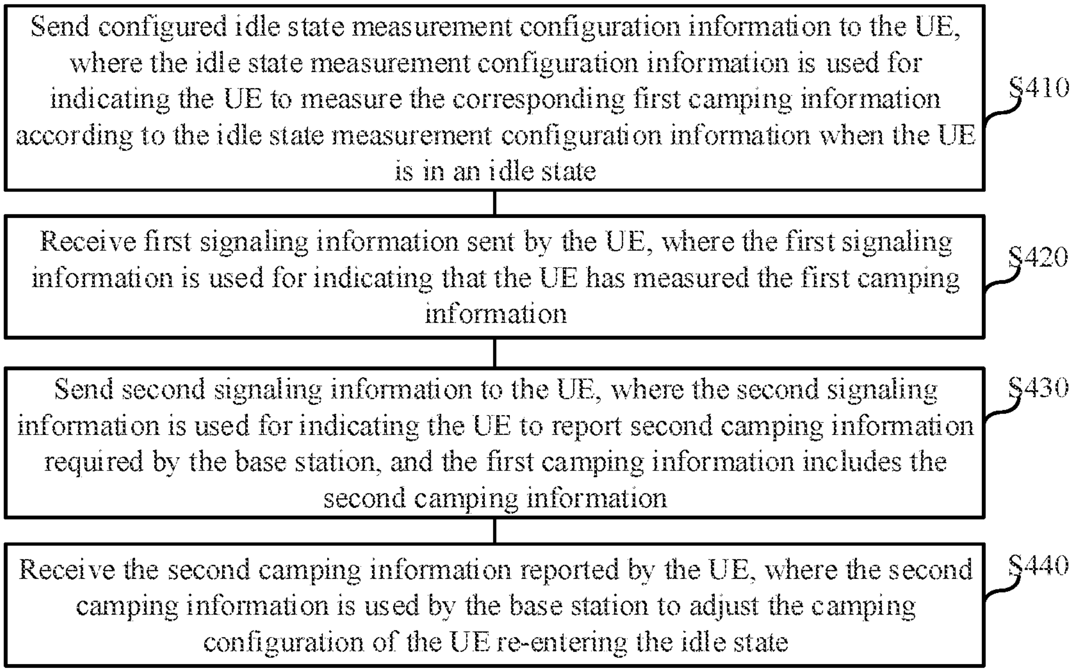
FIG. 4 is a schematic flowchart of a method for adjusting UE camping according to another embodiment of the present disclosure.

Yet another embodiment of the present disclosure provides an information transmission method, which is applied in the wireless communication system shown in FIG. 1 and executed by the base station 120 in FIG. 1. As shown in FIG. 4, the method includes: step S410, sending configured idle state measurement configuration information to the UE, Where the idle state measurement configuration information is used for indicating the UE to measure the corresponding first camping information according to the idle state measurement configuration information when the UE is in an idle state; step S420, receiving first signaling information sent by the UE, where the first signaling information is used for indicating that the UE has measured the first camping information; step S430, sending second signaling information to the UE, where the second signaling information is used for indicating the UE to report second camping information required by the base station, and the first camping information includes the second camping information; step S440, receiving the second camping information reported by the UE, where the second camping information is used by the base station to adjust the camping configuration of the UE re-entering the idle state.

The information transmission method on the base station side provided by the embodiments of the present disclosure corresponds to the information transmission method on the UE side provided by the embodiments of the present disclosure. Therefore, it can be understood that the processing steps of the information transmission on the base station side are corresponding to the steps of the information transmission on the UE side, that is, the relevant content of the steps of the information transmission at the UE side is also applicable to the processing steps of the information transmission at the base station side, and the processing steps of the information transmission at the base station side are not repeated here. For the specific description of the corresponding steps of the information transmission at the UE, side, the corresponding description in the foregoing may be referred to.

In a possible implementation manner, the idle state measurement configuration information includes one or more of the following:

a measurement start time; a measurement end time; a measurement duration; a Radio access technology (RAT) to be measured; a frequency to be measured; a cell to be measured; a quality of cell to be measured; an RAT where the UE camps; a cell where the UE camps; a duration of the RAT where the UE camps; a duration of the cell where the UE camps; a quality of the cell where the UE camps; a measurement time interval of the UE.

In a possible implementation manner, receiving the first signaling information sent by the UE, includes:

receiving the first signaling information sent by the UE through a first RRC signaling, where the first signaling information is sent when the UE in the idle state reestablishes a connection with the base station.

In a possible implementation manner, in response to the UE camping on a first type of network, the first RRC signaling is received through any one of the following signaling: RRC connection establishment complete (RRCConnectionSetupComplete) signaling, RRC connection reconfiguration complete (RRCConnectionReconfigurationComplete) signaling, RRC connection reestablishment complete (RRCConnectionReestablishmentComplete) signaling, and RRC connection resume complete (RRCConnectionResumeComplete) signaling.

In a possible implementation manner, in response to the UE camping on a second type of network, the first RRC signaling is received through any one of the following signaling: RRC setup complete (RRCSetupComplete) signaling, RRC reconfiguration complete (RRCReconfigurationComplete) signaling, RRC reestablishment complete (RRCReestablishmentComplete) signaling and RRC resume complete (RRCResumeComplete) signaling.

In a possible implementation manner, after receiving the second camping information reported by the LIE, the method further includes:

sending idle state camping configuration information configured based on the second camping information to the UE, where the idle state camping configuration information is used for indicating the UE to adjust the camping in the idle state according to the idle state camping configuration information when the UE re-enters the idle state.

In a possible implementation manner, sending the second signaling information to the UE includes:

sending the second signaling information to the UE through a second RRC signaling, where the second RRC signaling is located in UE information request (UEInformationRequest) signaling;

receiving the second camping information reported by the UE, includes:

receiving the second camping information reported by the UE through UE information response (UEInformationResponse) signaling.

In a possible implementation manner, sending the configured idle state measurement configuration information to the UE, includes:

sending the idle state measurement configuration information to the UE through a third RRC signaling, where the third RRC signaling includes logged measurement configuration (LoggedMeasurementConfiguration) signaling.

With the method provided by the embodiments of the present disclosure, when the UE is in an idle state, it can accurately measure the corresponding camping information according to the idle state measurement configuration information configured by the base station, and when the UE, measures the camping information, it can notify the base station in time, and according to the requirement of the base station, it reports the measured camping information to the base station, so that the base station can accurately obtain the camping information measured when the UE is in the idle state, so as to dynamically adjust the idle state camping configuration information when the UE is in the idle state again according to the camping information, which is convenient to dynamically adjust the camping situation when the UE is in the idle state again, so as to achieve the purpose of reducing the power consumption of the UE in the idle state.

Figure 5:
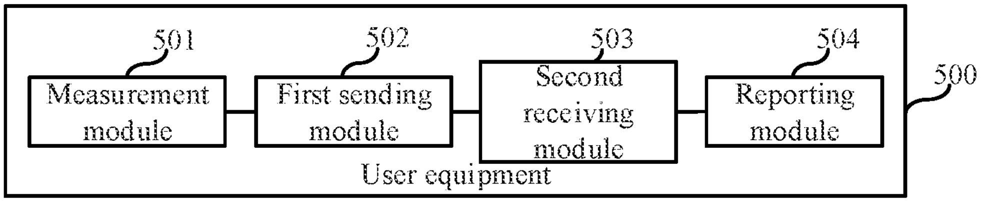
FIG. 5 is a schematic structural diagram of a user equipment according to an embodiment of the present disclosure.

FIG. 5 is a schematic structural diagram of an apparatus for adjusting the camping of a user equipment (UE) according to another embodiment of the present disclosure. As shown in FIG. 5, the apparatus 500 may include a measurement module 501, a first sending module 502, a first receiving module 503 and a reporting module 504.

The measurement module 501 is configured to, in response to the idle state, measure corresponding first camping information according to idle state measurement configuration information configured by the base station.

The first sending module 502 is configured to send, to the base station, first signaling information of measuring the first camping information, where the first signaling information is used for indicating that the UE has measured the first camping information.

The first receiving module 503 is configured to receive second signaling information sent by the base station, where the second signaling information is used for indicating the UE to report second camping information required by the base station, and the first camping information includes the second camping information.

The reporting module 504 is configured to report the second camping information to the base station, where the second camping information is used by the base station to adjust the camping configuration for the UE to re-enter the idle state.

In a possible implementation manner, the idle state measurement configuration information includes one or more of the following:

a measurement start time; a measurement end time; a measurement duration; a Radio access technology (RAT) to be measured; a frequency to be measured; a cell to be measured; a quality of cell to be measured; an RAT where the UE camps; a cell where the UE camps; a duration of the RAT where the UE camps; a duration of the cell where the UE camps; a quality of the cell where the UE camps; and a measurement time interval of the UE.

In a possible implementation manner, when the first sending module sends the first signaling information to the base station, it is configured to:

when the UE in the idle state re-establishes a connection with the base station, send first signaling information to the base station through a first radio resource control (RRC) signaling.

In a possible implementation manner, the first sending module sends the first RRC signaling through any one of the following signalings in response to the UE camping on the first type of network: RRC connection establishment complete (RRCConnectionSetupComplete) signaling, RRC connection reconfiguration complete (RRCConnectionReconfigurationComplete) signaling, RRC connection reestablishment complete (RRCConnectionReestablishmentComplete) signaling, and RRC connection resume complete (RRCConnectionResumeComplete) signaling.

In a possible implementation manner, the first sending module sends the first RRC signaling through any one of the following signalings in response to the UE camping on the second type of network: RRC setup complete (RRCSetupComplete) signaling, RRC reconfiguration complete (RRCReconfigurationComplete) signaling. RRC reestablishment completion (RRCReestablishmentComplete) signaling, and RRC resume complete (RRCResumeComplete) signaling.

In a possible implementation manner, it also includes a fourth receiving module; and the fourth receiving module is configured to receive the idle state camping configuration information configured by the base station based on the second camping information, and adjust the camping in the idle state according to the idle state camping configuration information when the UE re-enters the idle state.

In a possible implementation manner, the first receiving module is configured to receive second signaling information sent by the base station through a second. RRC signaling, where the second RRC signaling is located in UE information request (UEInformationRequest) signaling.

The reporting module is configured to report the second camping information to the base station through UE information response (UEInformationResponse) signaling.

In a possible implementation manner, the apparatus further includes: a fifth receiving module, configured to receive the idle state measurement configuration information configured by the base station.

When receiving the idle state measurement configuration information configured by the base station, the fifth receiving module is configured to receive the idle state measurement configuration information configured by the base station through a third RRC signaling, where the third RRC signaling includes logged measurement configuration (LoggedMeasurementConfiguration) signaling.

In the user equipment provided by the embodiments of the present disclosure, when the UE is in an idle state, it can accurately measure the corresponding camping information according to the idle state measurement configuration information configured by the base station, and when the UE measures the camping information, it can notify the base station in time, and according to the requirement of the base station, the measured camping information is reported to the base station, so that the base station can accurately obtain the camping information measured when the UE is in the idle state, so as to dynamically adjust the idle state camping configuration information when the UE is in the idle state again according to the camping information, which is facilitate to dynamically adjust the camping situation when the UE is in the idle state again, so as to achieve the purpose of reducing the power consumption of the UE in the idle state.

Figure 6:
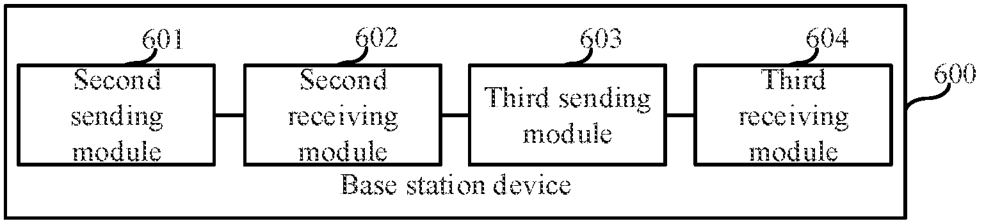
FIG. 6 is a schematic structural diagram of a base station device according to another embodiment of the present disclosure.

FIG. 6 is a schematic structural diagram of a base station device according to another embodiment of the present disclosure. As shown in FIG. 6, the apparatus 600 may include a second sending module 601, a second receiving module 602, a third sending module 603 and a third receiving module 604.

The second sending module is configured to send configured idle state measurement configuration information to the UE, where the idle state measurement configuration information is used for indicating the UE to measure corresponding camping information according to the idle state measurement configuration information when the UE is in an idle state.

The second receiving module is configured to receive first signaling information sent by the UE, where the first signaling information is used for indicating that the UE has measured the first camping information.

The third sending module is configured to send second signaling information to the UE, where the second signaling information is used for indicating the UE to report second camping information required by the base station, and the first camping information includes the second camping information.

The third receiving module is configured to receive second camping information reported by the UE, where the second camping information is used by the base station to adjust a camping configuration for the UE to re-enter the idle state.

In a possible implementation manner, the idle state measurement configuration information includes one or more of the following:

a measurement start time; a measurement end time; a measurement duration; a Radio access technology (RAT) to be measured; a frequency to be measured; a cell to be measured; a quality of cell to be measured; a RAT where the UE camps; a cell where the UE camps; a duration of the RAT where the UE camps; a duration of the cell where the UE camps; a quality of the cell where the UE camps; and a measurement time interval of the UE.

In a possible implementation manner, when receiving the first signaling information sent by the UE, the second receiving module is configured to receive the first signaling information sent by the UE through a first RRC signaling, and the first signaling information is sent when the UE in the idle state re-establishes a connection with the base station.

In a possible implementation manner, the second receiving module receives the first RRC signaling through any one of the following signalings in response to the LIE camping on a first type of network; RRC connection setup complete (RRCConnectionSetupComplete) signaling, RRC connection reconfiguration complete (RRCConnectionReconfigurationComplete) signaling, RRC connection reestablishment complete (RRCConnectionReestablishmentComplete) signaling. RRC connection resume complete (RRCConnectionResumeComplete) signaling.

In a possible implementation manner, in response to the UE camping on the second type of network, the second receiving module receives the first RRC signaling through any one of the following signalings: RRC setup complete (RRCSetupComplete) signaling, RRC reconfiguration complete (RRCReconfigurationComplete) signaling. RRC reestablishment complete (RRCReestablishmentComplete) signaling, and RRC resume complete (RRCResumeComplete) signaling.

In a possible implementation, it also includes a fourth sending module.

The fourth sending module is configured to send the idle state camping configuration information configured based on the second camping information to the UE, and the idle state camping configuration information is used for indicating the UE to adjust the idle state camping according to the idle state camping configuration information when re-entering the idle state.

In a possible implementation manner, the third sending module is configured to send the second signaling information to the UE through a second RRC signaling, where the second RRC signaling is located in UE information request (UEInformationRequest) signaling.

The third receiving module is configured to receive the second camping information reported by the UE through UE information response (UEInformationResponse) signaling.

In a possible implementation manner, the second sending module is configured to send the idle state measurement configuration information to the UE through third RRC signaling, where the third RRC signaling includes logged measurement configuration (LoggedMeasurementConfiguration) signaling.

In the base station device provided by the embodiments of the present disclosure, when the UE is in an idle state, it can accurately measure the corresponding camping information according to the idle state measurement configuration information configured by the base station, and when the UE measures the camping information, it can notify the base station in time, and according to the requirement of the base station, the measured camping information is reported to the base station, so that the base station can accurately obtain the camping information measured when the UE is in the idle state, so as to dynamically adjust the idle state camping configuration information when the UE is in the idle state again according to the camping information, which facilitates to dynamically adjust the camping situation when the UE is in the idle state again, so as to achieve the purpose of reducing the power consumption of the UE in the idle state.

It should be noted that, the present embodiment is an apparatus embodiment corresponding to the above-mentioned method embodiment, and the present embodiment may be implemented in cooperation with the above-mentioned method embodiment. The relevant technical details mentioned in the foregoing method embodiment are still valid in the present embodiment, and are not repeated here in order to reduce repetition. Correspondingly, the relevant technical details mentioned in the present embodiment may also be applied to the above method embodiment.

Figure 7:
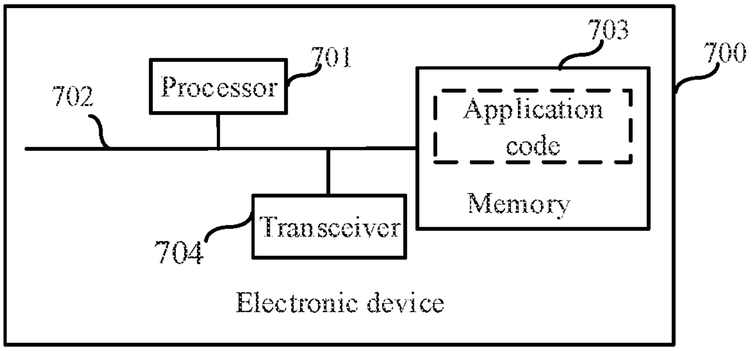
FIG. 7 is a schematic structural diagram of an electronic device according to an embodiment of the present disclosure.

Another embodiment of the present disclosure provides an electronic device. As shown in FIG. 7, the electronic device 700 shown in FIG. 7 includes: a processor 701 and a memory 703. The processor 701 is connected to the memory 703, for example, through a bus 702. Further, the electronic device 700 may also include a transceiver 704. It should be noted that, in practical applications, the transceiver 704 is not limited to one, and the structure of the electronic device 700 does not constitute a limitation to the embodiments of the present disclosure.

The processor 701 is applied in the embodiments of the present disclosure to implement the functions of the first processing module, the second processing module, and the adjustment module shown in FIG. 5, and may also be used to implement the functions of the sending module and the third processing module shown in FIG. 6. The transceiver 704 includes a receiver and a transmitter, and the transceiver 704 is applied in the embodiments of the present disclosure to implement a transceiver function.

The processor 701 may be a CPU, a general purpose processor, a DSP, an ASIC, an FPGA or other programmable logic devices, transistor logic devices, hardware components, or any combination thereof. It may implement or execute the various exemplary logical blocks, modules and circuits described in connection with the present disclosure. The processor 701 may also be a combination that realizes computing functions, such as a combination of one or more microprocessors, a combination of a DSP and a microprocessor, and the like.

The bus 702 may include a path to communicate information between the components described above. The bus 702 may be a PCI bus, an EISA bus, or the like. The bus 702 may be divided into an address bus, a data bus, a control bus, and the like. For ease of presentation, only one thick line is used in FIG. 7, but it does not mean that there is only one bus or one type of bus.

The memory 703 may be an ROM or other types of static storage devices that can store static information and instructions, an RAM or other types of dynamic storage devices that can store information and instructions, or an EEPROM, a CD-ROM or other optical disk storage, optical disc storage including a compact disc, a laser disc, an optical disc, a digital versatile discs, a Blu-ray disc, etc.), magnetic disk storage media or other magnetic storage devices, or any other medium capable of carrying or storing desired program code in the form of instructions or data structures and capable of being accessed by a computer, and the present disclosure is not limited thereto.

The memory 703 is used for storing application program codes for executing the solutions of the present disclosure, and the execution is controlled by the processor 701. The processor 701 is configured to execute the application program codes stored in the memory 703 to implement the actions of the user equipment provided by the embodiment shown in FIG. 5, or the actions of the base station device provided by the embodiment shown in FIG. 6.

The electronic device provided by the embodiments of the present disclosure includes a memory, a processor, and a computer program stored in the memory and running on the processor. When the processor executes the program, the following functions can be implemented.

In an aspect, in response to the user equipment (UE) being in an idle state, the corresponding first camping information is measured according to the idle state measurement configuration information configured by the base station; then, first signaling information is sent to the base station, where the first signaling information is used for indicating that the UE has measured the first camping information; then, the second signaling information sent by the base station is received, and the second signaling information is used for indicating the UE to report the second camping information required by the base station, and the first camping information includes the second camping information; and then, the second camping information is reported to the base station, and the second camping information is used by the base station to adjust the camping configuration for the IJE to re-enter the idle state.

On the other hand, the configured idle state measurement configuration information is sent to the UE, and the idle state measurement configuration information is used for indicating the UE to measure the corresponding first camping information according to the idle state measurement configuration information when the UE is in an idle state; then, the first signaling information sent by the UE is received, the first signaling information is used for indicating that the UE has measured the first camping information; then, the second signaling information is sent to the UE, and the second signaling information is used for indicating the UE to report the second camping information required by the base station, the first camping information includes the second camping information; next, the second camping information reported by the UE is received, and the second camping information is used by the base station to adjust the camping configuration for the UE When re-entering the idle state.

Embodiments of the present disclosure provide a computer-readable storage medium, where a computer program is stored on the computer-readable storage medium, and when the program is executed by a processor, the methods shown in the foregoing embodiments are implemented. When the UE is in the idle state, it can accurately measure the corresponding camping information according to the idle state measurement configuration information configured by the base station, and when the UE measures the camping information, it can notify the base station in time, and according to the requirement of the base station, the measured camping information is reported to the base station, so that the base station can accurately obtain the camping information of the UE in the idle state, so as to dynamically adjust the idle stale camping configuration information according to the camping information when the UE is in the idle stale again, which is convenient for dynamically adjusting the camping situation when the UE is in the idle state again, thereby achieving the purpose of reducing the power consumption of the UE in the idle state.

The computer-readable storage medium provided by the embodiments of the present disclosure is applicable to any embodiment of the foregoing methods.

It should be understood that although the various steps in the flowchart of the accompanying drawings are sequentially shown in the order indicated by the arrows, these steps are not necessarily executed in sequence in the order indicated by the arrows. Unless explicitly stated herein, the execution of these steps is not strictly limited to the order and may be performed in other orders. Moreover, at least a part of the steps in the flowchart of the accompanying drawings may include a plurality of sub-steps or a plurality of stages, and these sub-steps or stages are not necessarily executed at the same time, but may be executed at different times, and the execution sequence is not necessary performed sequentially, but may be performed in turn or alternately with other steps or sub-steps of other steps or at least a portion of the stages.

The above are only some embodiments of the present disclosure. It should be pointed out that for those skilled in the art, without departing from the principles of the present disclosure, several improvements and modifications can be made. Such improvements and modifications should be regarded as the protection scope of the present disclosure.

What is claimed is:

1. An information sending method, performed by user equipment (UE), comprising:

measuring corresponding first camping information according to idle state measurement configuration information configured by a base station, wherein the UE is in an idle state;

sending first signaling information to the base station, wherein the first signaling information indicates that the UE has measured the first camping information;

receiving second signaling information sent by the base station, wherein the second signaling information indicates the UE to report second camping information required by the base station, and the first camping information comprises the second camping information;

reporting the second camping information to the base station, wherein the second camping information is used by the base station to adjust a camping configuration of the UE when re-entering the idle state;

receiving idle state camping configuration information configured by the base station based on the second camping information; and adjusting camping in the idle state according to the idle state camping configuration information when the UE re-enters the idle state;

wherein the sending the first signaling information to the base station comprises:

sending the first signaling information to the base station through a first radio resource control (RRC) signaling, wherein the UE in the idle state re-establishes a connection with the base station;

wherein the first RRC signaling is one of:

RRC connection reconfiguration complete signaling,

RRC connection reestablishment complete signaling,

RRC connection resume complete signaling,

RRC reconfiguration complete signaling,

RRC reestablishment complete signaling, or

RRC resume complete signaling;

wherein the idle state measurement configuration information comprises a measurement start time, and the measuring the corresponding first camping information according to the idle state measurement configuration information configured by the base station, comprises:

measuring the corresponding first camping information according to the idle state measurement configuration information configured by the base station, in response to the UE being in the idle state and reaching the measurement start time;

wherein the second camping information comprises a signal strength measurement result of a first type of network, and the receiving the idle state camping configuration information configured by the base station based on the second camping information comprises:

receiving the idle state camping configuration information indicating the UE re-entering the idle state to camp on the first type of network in response to the signal strength measurement result exceeding a predetermined threshold.

2. The method according to claim 1, wherein the idle state measurement configuration information comprises at least one of:
a measurement end time;
a measurement duration;
a radio access technology (RAT) to be measured;
a frequency to be measured;
a cell to be measured;
a quality of a cell to be measured;
a RAT where the UE camps;
a cell where the UE camps;
a duration of a RAT where the UE camps;
a duration of a cell where the UE camps;
a quality of a cell where the UE camps; or
a measurement time interval of the UE.

3. The method according to claim 1, wherein the receiving the second signaling information sent by the base station comprises:
receiving the second signaling information sent by the base station through a second RRC signaling, wherein the second RRC signaling is located in UE information request signaling; and
the reporting the second camping information to the base station comprises:
reporting the second camping information to the base station through UE information response signaling.

4. The method according to claim 1, further comprising:
receiving the idle state measurement configuration information configured by the base station through a third RRC signaling, wherein the third RRC signaling comprises logged measurement configuration signaling.

5. A non-transitory computer-readable storage medium having stored thereon a computer program that, when executed by a processor, causes the processor to perform the method according to claim 1.

6. An information transmission method, performed by a base station, comprising:
sending a configured idle state measurement configuration information to user equipment (UE), wherein the idle state measurement configuration information indicates the UE to measure corresponding first camping information according to the idle state measurement configuration information when the UE is in an idle state;
receiving first signaling information sent by the UE, wherein the first signaling information indicates that the UE has measured the first camping information;
sending second signaling information to the UE, wherein the second signaling information indicates the UE to report second camping information required by the base station, and the first camping information comprises the second camping information;
receiving the second camping information reported by the UE, wherein the second camping information is used by the base station to adjust a camping configuration of the UE when re-entering the idle state;
sending idle state camping configuration information configured based on the second camping information to the UE, wherein the idle state camping configuration information indicates the UE to adjust camping in the idle state according to the idle state camping configuration information when the UE re-enters the idle state;
wherein the receiving the first signaling information sent by the UE comprises:
receiving the first signaling information sent by the UE through a first radio resource control (RRC) signaling, wherein the UE in the idle state re-establishes a connection with the base station;
wherein the first RRC signaling is one of:
RRC connection reconfiguration complete signaling,
RRC connection reestablishment complete signaling,
RRC connection resume complete signaling,
RRC reconfiguration complete signaling,
RRC reestablishment complete signaling, or
RRC resume complete signaling;
wherein the idle state measurement configuration information comprises a measurement start time, and the idle state measurement configuration information indicating the UE to measure the corresponding first camping information according to the idle state measurement configuration information when the UE is in the idle state comprises:
the idle state measurement configuration information indicating the UE to measure the corresponding first camping information according to the idle state measurement configuration information in response to the UE being in the idle state and reaching the measurement start time;
wherein the second camping information comprises a signal strength measurement result of a first type of network, and the sending the idle state camping configuration information configured based on the second camping information to the UE comprises:
sending to the UE the idle state camping configuration information indicating the UE re-entering the idle state to camp on the first type of network in response to the signal strength measurement result exceeding a predetermined threshold.

7. The method according to claim 6, wherein the idle state measurement configuration information comprises at least one of:
a measurement end time;
a measurement duration;
a radio access technology (RAT) to be measured;
a frequency to be measured; a cell to be measured;
a quality of a cell to be measured;
a RAT where the UE camps;
a cell where the UE camps;
a duration of a RAT where the UE camps;
a duration of a cell where the UE camps;
a quality of a cell where the UE camps; or
a measurement time interval of the UE.

8. The method according to claim 6, wherein the sending the second signaling information to the UE comprises:
sending the second signaling information to the UE through a second RRC signaling, wherein the second RRC signaling is located in UE information request signaling; and
the receiving the second camping information reported by the UE comprises:
receiving the second camping information reported by the UE through UE information response signaling.

9. The method according to claim 6, wherein the sending the configured idle state measurement configuration information to the UE comprises:
sending the idle state measurement configuration information to the UE through a third RRC signaling, wherein the third RRC signaling comprises logged measurement configuration signaling.

10. A base station, comprising:

a processor; and a memory storing instructions executable by the processor;

wherein the processor is configured to perform the method of claim 6.

11. A non-transitory computer-readable storage medium having stored thereon a computer program that, when executed by a processor, causes the processor to perform the method according to claim 6.

12. User equipment (UE), comprising:

a processor; and a memory storing instructions executable by the processor;

wherein the processor is configured to:

measure corresponding first camping information according to idle state measurement configuration information configured by a base station, wherein the UE is in an idle state;

send first signaling information to the base station, wherein the first signaling information indicates that the UE has measured the first camping information;

receive second signaling information sent by the base station, wherein the second signaling information indicates second camping information required by the base station, and the first camping information comprises the second camping information;

report the second camping information to the base station, wherein the second camping information is used by the base station to adjust a camping configuration of the UE when re-entering the idle state;

receive idle state camping configuration information configured by the base station based on the second camping information, and adjust camping in the idle state according to the idle state camping configuration information when the UE re-enters the idle state;

wherein the processor is further configured to:

send the first signaling information to the base station through a first radio resource control (RRC) signaling, wherein the UE in the idle state re-establishes a connection with the base station;

wherein the first RRC signaling is one of:

RRC connection reconfiguration complete signaling,

RRC connection reestablishment complete signaling,

RRC connection resume complete signaling,

RRC reconfiguration complete signaling,

RRC reestablishment complete signaling, or

RRC resume complete signaling;

wherein the idle state measurement configuration information comprises a measurement start time, and the processor is further configured to:

measure the corresponding first camping information according to the idle state measurement configuration information configured by the base station, in response to the UE being in the idle state and reaching the measurement start time;

wherein the second camping information comprises a signal strength measurement result of a first type of network, and the processor is further configured to:

receive the idle state camping configuration information indicating the UE re-entering the idle state to camp on the first type of network in response to the signal strength measurement result exceeding a predetermined threshold.

13. The UE according to claim 12, wherein the idle state measurement configuration information comprises at least one of:

a measurement end time;

a measurement duration;

a radio access technology (RAT) to be measured;

a frequency to be measured; a cell to be measured;

a quality of a cell to be measured;

a RAT where the UE camps;

a cell where the UE camps;

a duration of a RAT where the UE camps;

a duration of a cell where the UE camps;

a quality of a cell where the UE camps; or a measurement time interval of the UE.

* * * * *